(12) United States Patent
Ho et al.

(10) Patent No.: US 11,997,482 B2
(45) Date of Patent: May 28, 2024

(54) ASSOCIATION PROTECTION FOR WIRELESS NETWORKS

(71) Applicant: QUALCOMM Incorporated, San Diego, CA (US)

(72) Inventors: Sai Yiu Duncan Ho, San Diego, CA (US); Jouni Kalevi Malinen, Tuusula (FI); George Cherian, San Diego, CA (US); Philip Michael Hawkes, Valley Heights (AU)

(73) Assignee: QUALCOMM Incorporated, San Diego, CA (US)

( * ) Notice: Subject to any disclaimer, the term of this patent is extended or adjusted under 35 U.S.C. 154(b) by 104 days.

(21) Appl. No.: 17/676,081

(22) Filed: Feb. 18, 2022

(65) Prior Publication Data
US 2023/0269581 A1  Aug. 24, 2023

(51) Int. Cl.
*G06F 21/00*   (2013.01)
*H04W 12/03*   (2021.01)
*H04W 12/041*   (2021.01)
*H04W 12/0471*   (2021.01)

(52) U.S. Cl.
CPC ....... *H04W 12/0471* (2021.01); *H04W 12/03* (2021.01); *H04W 12/041* (2021.01)

(58) Field of Classification Search
CPC ............. H04W 12/0471; H04W 12/03; H04W 12/041
See application file for complete search history.

(56) References Cited

U.S. PATENT DOCUMENTS

2016/0295409 A1\* 10/2016 Lee ................. H04W 12/04
2021/0345105 A1  11/2021 Peer et al.
2023/0009140 A1\*  1/2023 Trainin ............. H04W 24/02
2023/0144897 A1\*  5/2023 Kneckt ............. H04W 48/08
                                                       455/434

FOREIGN PATENT DOCUMENTS

EP      4149140 A1 \*  3/2023 ............ H04W 12/02
WO   2013040039 A1     3/2013

OTHER PUBLICATIONS

IEEE Draft Standard for Information technology—Telecommunications and information exchange between systems Local and metropolitan area networks—Specific requirements Part 11: Wireless LAN Medium Access Control (MAC) and Physical Layer (PHY) Specifications—Amendment 4 (Year: 2021).\*
International Search Report and Written Opinion—PCT/US2023/061968—ISA/EPO—dated Jul. 18, 2023.
(Continued)

*Primary Examiner* — Kendall Dolly
(74) *Attorney, Agent, or Firm* — Patterson & Sheridan LLP

(57) ABSTRACT

Certain aspects of the present disclosure relate to wireless communications. According to certain aspects, a method that may be performed by an access point (AP) includes outputting, for transmission to an access point (AP), a request to associate with the AP, wherein the request is encrypted with a first set of one or more keys; obtaining, from the AP, a response to the request; decrypting the response, based on the first set of keys, to obtain a second set of one or more keys; and using the second set of keys for secure data exchange with the AP.

23 Claims, 14 Drawing Sheets

(56) References Cited

OTHER PUBLICATIONS

"802.11 Working Group of LAN/WAN Standard Committee of the IEEE: Draft P802.11AZ_D4.1", IEEE-SA, Piscataway, NJ USA vol. 802.11az drafts, No. D4.1 Feb. 7, 2022, pp. 1-283, XP068191567, Section 12.12.
Partial International Search Report—PCT/US2023/061968—ISA/EPO—dated May 24, 2023.

* cited by examiner

| Base AKM | |
|---|---|
| PMKSA exists (e.g., PMK caching) | PASN(PMKSA) + (re)assoc req/resp encrypted + GTK/IGTK/BIGTK in assoc resp |
| SAE | PASN(SAE) + (re)assoc req/resp encrypt + GTK/IGTK/BIGTK in assoc resp |
| FILS Shared Key | PASN(FILS Shared Key) + (re)assoc req/resp encrypt + GTK/IGTK/BIGTK in assoc resp |
| FILS Public Key | PASN(FILS Public Key) + (re)assoc req/resp encrypt + GTK/IGTK/BIGTK in assoc resp<br><br>Extend PASN to support FILS Public Key |
| FT | PASN(FT) + (re)assoc req/resp encrypt + GTK/IGTK/BIGTK in assoc resp |

FIG. 6A

| Base AKM | |
|---|---|
| OWE | PASN(no-auth) + (re)assoc req/resp encrypt + GTK/IGTK/BIGTK in assoc resp |
| EAP | EAP in Authentication frames to derive PMKSA + PASN(PMKSA) + (re)assoc req/resp encrypt + GTK/IGTK/BIGTK in assoc resp |
| PSK | Replace with SAE |

FIG. 6B

ASSOCIATION PROTECTION FOR WIRELESS NETWORKS

TECHNICAL FIELD

Certain aspects of the present disclosure generally relate to wireless communications and, more particularly, to protecting association messages in wireless networks.

DESCRIPTION OF THE RELATED TECHNOLOGY

Wireless communications networks are widely deployed to provide various communications services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the issue of increasing bandwidth requirements that are demanded for wireless communications systems, different schemes are being developed to allow multiple user terminals to communicate with a single access point by sharing the channel resources while achieving high data throughputs. Multiple Input Multiple Output (MIMO) technology represents one such approach that has emerged as a popular technique for communications systems. MIMO technology has been adopted in several wireless communications standards such as the Institute of Electrical and Electronics Engineers (IEEE) 802.11 standard. The IEEE 802.11 denotes a set of Wireless Local Area Network (WLAN) air interface standards developed by the IEEE 802.11 committee for short-range communications (such as tens of meters to a few hundred meters).

SUMMARY

The systems, methods and devices of this disclosure each have several innovative aspects, no single one of which is solely responsible for the desirable attributes disclosed herein.

Certain aspects of the present disclosure provide a method for wireless communication at a station. The method generally includes outputting, for transmission to an access point (AP), a request to associate with the AP, wherein the request is encrypted with a first set of one or more keys; obtaining, from the AP, a response to the request; decrypting the response, based on the first set of keys, to obtain a second set of one or more keys; and using the second set of keys for secure data exchange with the AP.

Certain aspects of the present disclosure provide a method for wireless communication at a station. The method generally includes establishing a first set of one or more keys, via a key exchange with an access point (AP); and using the first set of keys to process at least one of an authentication message output, for transmission to the station, as part of a pre-association security association (PASN) procedure or an authentication message obtained from the station, as part of the PASN procedure.

Certain aspects of the present disclosure provide a method for wireless communication at a station. The method generally includes establishing a first set of one or more keys, via a key exchange with an access point (AP); and using the first set of keys to process at least one of an authentication message output, for transmission to the AP, as part of a pre-association security association (PASN) procedure or an authentication message obtained from the AP, as part of the PASN procedure.

Certain aspects of the present disclosure provide a method for wireless communication at an access point (AP). The method generally includes establishing a first set of one or more keys, via a key exchange with a station; and using the first set of keys to process at least one of an authentication message obtained from the station as part of a pre-association security association (PASN) procedure or an authentication message output, for transmission to the station, as part of the PASN procedure.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure, and the description may admit to other equally effective aspects.

FIGS. 6A and 6B illustrate example authentication and key management (AKM) functions, in accordance with aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
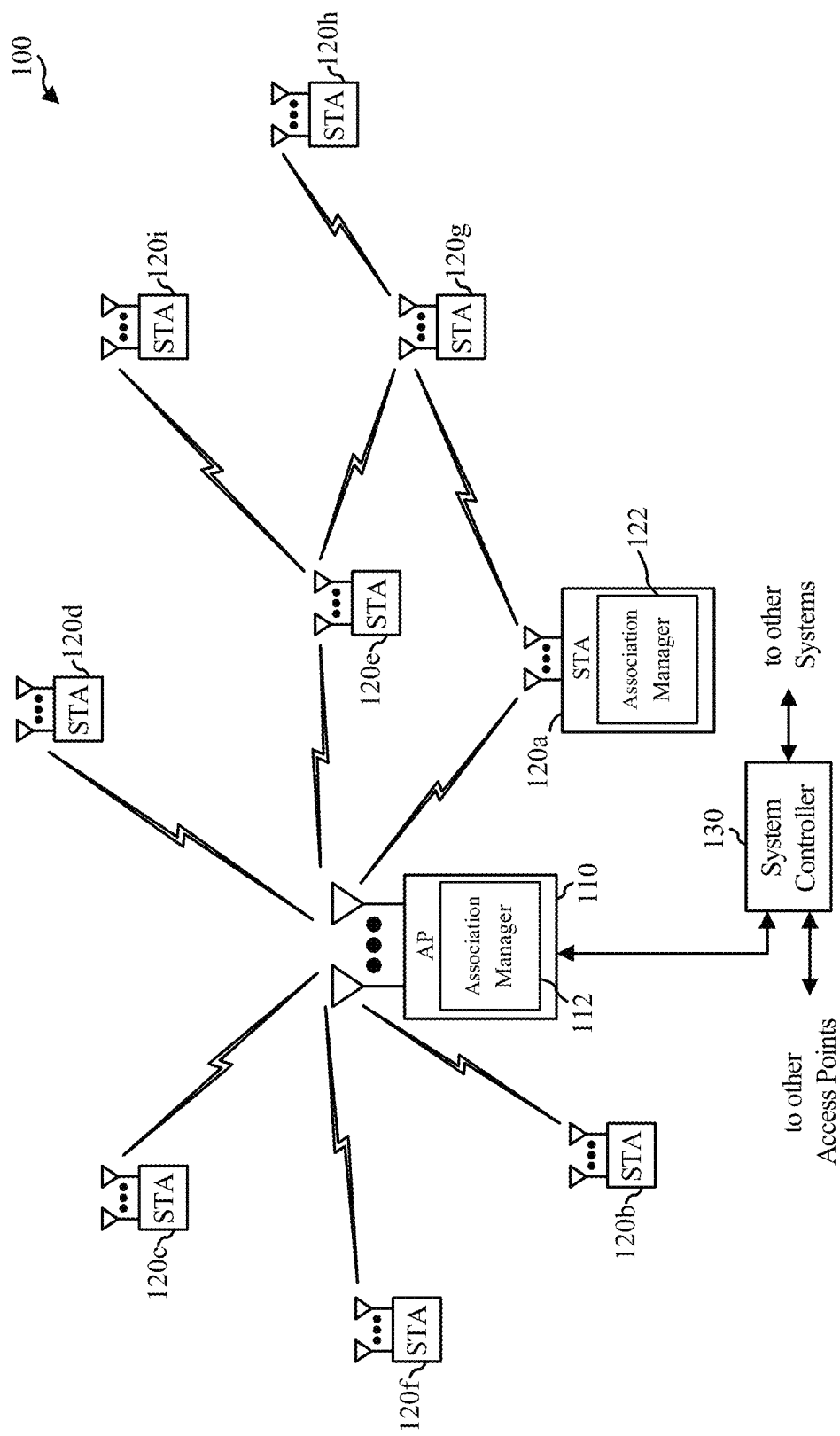
FIG. 1 is a diagram of an example wireless communications network, in accordance with certain aspects of the present disclosure.

Aspects of the present disclosure provide apparatus, methods, processing systems, and computer readable mediums for protecting messages transmitted in certain procedures when accessing a wireless network (e.g., an 802.11 network). For example, the mechanisms provided herein may help protect information included in authentication messages, association messages, and re-association messages.

In wireless networks, authentication is generally the first step that a wireless device (e.g., a station) performs when accessing (attaching to) a wireless network. In a typical authentication process, a station establishes its identity with an Access Point (AP) or other network entity (e.g., a wireless router). Typically, there is no data encryption or security available at this stage.

Once authentication is complete, a station can associate (or register) with an AP to gain full access to the network. Association generally allows an AP to record each station to help ensure frames are properly delivered. In a typical association process, a station sends an association request to the AP (after authentication). The AP then processes the association request, for example, applying one or more criteria to decide if the station request should be allowed. If the AP grants the request, a response is sent assigning the station with an association ID (AID), used to identify the station for delivery of frames.

In some cases, a station moving from one AP to another within the same network may perform a re-association process. In re-association, the APs may coordinate to deliver frames to/from the station and the re-association process informs the network of its new location. Like the association process, the re-association process involves sending a request and a response.

One potential issue with conventional association and re-association processes is that some elements included in the requests and responses may be sent in-the-clear (unencrypted). This may represent a significant vulnerability, resulting in potentially deleterious consequences if unencrypted data in these messages results in a leaked privacy information. One example scenario is that certain devices may have certain combinations of capabilities, which could be detectable in unencrypted requests and/or responses, which may be useful to malicious actors. For example, such actors may use finger printing, which generally refers to identification of a device by extracting some externally observable characteristics through its wireless traffic. After identifying a device (or type of device) based on finger-printed capabilities, an actor may be able to gather other information (such as the user, its purpose, or the like).

Aspects of the present disclosure propose various mechanisms for protecting such information from fingerprinting. For example, aspects of the present disclosure propose encrypting (re-)association requests or responses in order to hide the information contained therein. As a result, such techniques may help remove the vulnerability of (re-association) messages to fingerprinting and may help avoid the potentially dire consequences.

Overview of Wireless Communication Systems

Various aspects of the disclosure are described more fully hereinafter with reference to the accompanying drawings. This disclosure may, however, be implemented in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be implemented by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various broadband wireless communications systems, including communications systems that are based on an orthogonal multiplexing scheme. Examples of such communications systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (such as implemented within or performed by) a variety of wired or wireless apparatuses (such as nodes). In some aspects, a wireless node implemented in accordance with the teachings herein may comprise an access point or an access terminal.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (such as a cellular phone or smart phone), a computer (such as a laptop), a tablet, a portable communications device, a portable computing device (such as a personal data assistant), an entertainment device (such as a music or video device, or a satellite radio), a global positioning system (GPS) device, or any other suitable device that is configured to communicate via a wireless or wired medium. In some aspects, the node is a wireless node. Such wireless node may provide, for example, connectivity for or to a network (such as a wide area network such as the Internet or a cellular network) via a wired or wireless communications link.

Example Wireless Communication System

FIG. 1 is a diagram illustrating an example wireless communication system 100, in accordance with certain aspects of the present disclosure. System 100 may be a multiple-input multiple-output (MIMO)/multi-link operation (MLO) system 100. As shown in FIG. 1, an access point (AP) 110 includes an association manager 112 that may be configured to take one or more actions described herein. The wireless station (STA) 120a includes an association manager 122 that may be configured to take one or more actions described herein. In aspects, AP 110 and wireless station 120a may be MLDs as further described herein with respect to FIG. 3.

For simplicity, only one AP 110 is shown in FIG. 1. An AP is generally a fixed station that communicates with the wireless STAs and may also be referred to as a base station (BS) or some other terminology. A wireless STA may be fixed or mobile and may also be referred to as a mobile STA, a wireless device, or some other terminology. AP 110 may communicate with one or more wireless STAs 120 at any given moment on the downlink (DL) and/or uplink (UL). The DL (i.e., forward link) is the communication link from AP 110 to the wireless STAs 120, and the UL (i.e., reverse link) is the communication link from the wireless STAs 120 to AP 110. A wireless STA 120 may also communicate peer-to-peer with another wireless STA 120, for example, via a direct link such as a tunneled direct link setup (TDLS). A system controller 130 may be in communication with and provide coordination and control for the access points.

While portions of the following disclosure will describe wireless STAs 120 capable of communicating via Spatial Division Multiple Access (SDMA), for certain aspects, the wireless STAs 120 may also include some wireless STAs 120 that do not support SDMA. Thus, for such aspects, an AP 110 may be configured to communicate with both SDMA and non-SDMA wireless STAs 120. This approach may conveniently allow older versions of wireless STAs 120 ("legacy" stations) to remain deployed in an enterprise, extending their useful lifetime, while allowing newer SDMA wireless STAs 120 to be introduced as deemed appropriate.

System 100 employs multiple transmit and multiple receive antennas for data transmission on the DL and UL. AP 110 is equipped with $N_{ap}$ antennas and represents the multiple-input (MI) for DL transmissions and the multiple-output (MO) for UL transmissions. A set of K selected wireless stations 120 collectively represents the multiple-output for DL transmissions and the multiple-input for UL transmissions. For pure SDMA, it is desired to have $N_{ap} \geq K \geq 1$ if the data symbol streams for the K wireless STAs are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected wireless STA transmits user-specific data to and/or receives user-specific data from the access point. In general, each selected wireless STA may be equipped with one or multiple antennas (i.e., $N_{sta} \geq 1$). The K selected wireless STAs can have the same or different number of antennas.

System 100 may be a time division duplex (TDD) system or a frequency division duplex (FDD) system. For a TDD system, the DL and UL share the same frequency band. For an FDD system, the DL and UL use different frequency bands. System 100 may also utilize a single carrier or multiple carriers for transmission. Each wireless STA may be equipped with a single antenna or multiple antennas. System 100 may also be a TDMA system if wireless STAs 120 share the same frequency channel by dividing transmission/reception into different time slots, each time slot being assigned to a different wireless STA 120.

Figure 2:
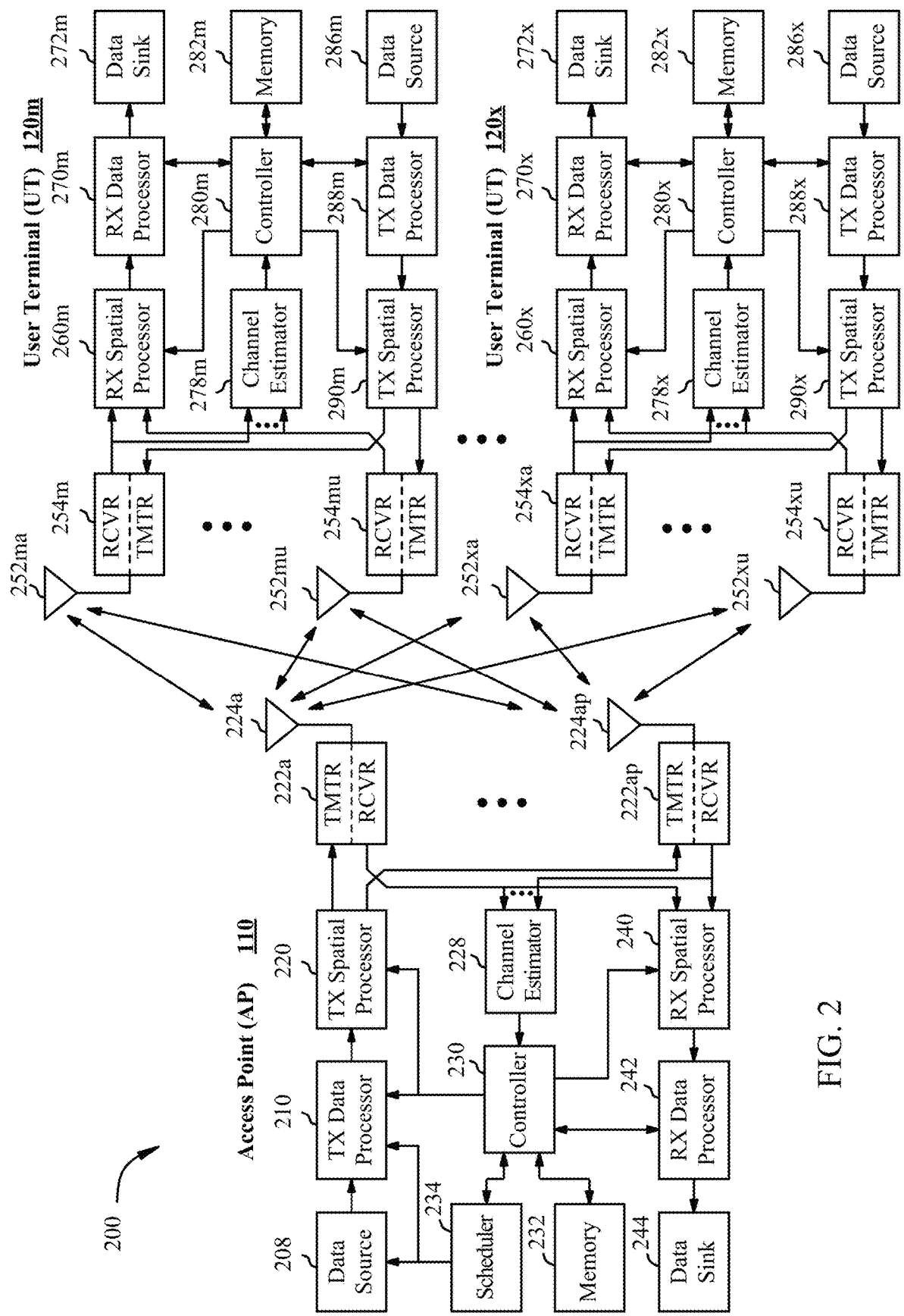
FIG. 2 is a block diagram of an example access point (AP) and example wireless stations (STAs), in accordance with certain aspects of the present disclosure.

FIG. 2 illustrates a block diagram of AP 110 and two wireless STAs 120m and 120x in a MIMO/MLO system, such as system 100, in accordance with certain aspects of the present disclosure. In certain aspects, AP 110 and/or wireless STAs 120m and 120x may perform various techniques to ensure that a non-AP MLD is able to receive a group addressed frame. For example, AP 110 and/or wireless STAs 120m and 120x may include a respective association manager as described herein with respect to FIG. 1.

AP 110 is equipped with $N_{ap}$ antennas 224a through 224t. Wireless STA 120m is equipped with $N_{sta,m}$ antennas 252ma through 252mu, and wireless STA 120x is equipped with $N_{sta,x}$ antennas 252xa through 252xu. AP 110 is a transmitting entity for the DL and a receiving entity for the UL. Each wireless STA 120 is a transmitting entity for the UL and a receiving entity for the DL. As used herein, a "transmitting entity" is an independently operated apparatus or device capable of transmitting data via a wireless channel, and a "receiving entity" is an independently operated apparatus or device capable of receiving data via a wireless channel. The term communication generally refers to transmitting, receiving, or both. In the following description, the subscript "DL" denotes the downlink, the subscript "UL" denotes the uplink, $N_{UL}$ wireless STAs are selected for simultaneous transmission on the uplink, $N_{DL}$ wireless STAs are selected for simultaneous transmission on the downlink, $N_{UL}$ may or may not be equal to $N_{DL}$, and $N_{UL}$ and $N_{DL}$ may be static values or can change for each scheduling interval. The beam-steering or some other spatial processing technique may be used at the access point and wireless station.

On the UL, at each wireless STA 120 selected for UL transmission, a transmit (TX) data processor 288 receives traffic data from a data source 286 and control data from a controller 280. TX data processor 288 processes (e.g., encodes, interleaves, and modulates) the traffic data for the wireless station based on the coding and modulation schemes associated with the rate selected for the wireless STA and provides a data symbol stream. A TX spatial processor 290 performs spatial processing on the data symbol stream and provides $N_{sta,m}$ transmit symbol streams for the $N_{sta,m}$ antennas. Each transceiver (TMTR) 254 receives and processes (e.g., converts to analog, amplifies, filters, and frequency upconverts) a respective transmit symbol stream to generate an uplink signal. $N_{sta,m}$ transceivers 254 provide $N_{sta,m}$ UL signals for transmission from $N_{sta,m}$ antennas 252 to AP 110.

$N_{UL}$ wireless STAs may be scheduled for simultaneous transmission on the uplink. Each of these wireless STAs performs spatial processing on its data symbol stream and transmits its set of transmit symbol streams on the UL to the AP 110.

At AP 110, $N_{ap}$ antennas 224a through 224ap receive the UL signals from all $N_{UL}$, wireless STAs transmitting on the UL. Each antenna 224 provides a received signal to a respective transceiver (RCVR) 222. Each transceiver 222 performs processing complementary to that performed by transceiver 254 and provides a received symbol stream. A receive (RX) spatial processor 240 performs receiver spatial processing on the $N_{ap}$ received symbol streams from $N_{ap}$ transceiver 222 and provides $N_{UL}$ recovered UL data symbol streams. The receiver spatial processing is performed in accordance with the channel correlation matrix inversion (CCMI), minimum mean square error (MMSE), soft interference cancellation (SIC), or some other technique. Each recovered UL data symbol stream is an estimate of a data symbol stream transmitted by a respective wireless station. An RX data processor 242 processes (e.g., demodulates, deinterleaves, and decodes) each recovered uplink data symbol stream in accordance with the rate used for that stream to obtain decoded data. The decoded data for each wireless STA may be provided to a data sink 244 for storage and/or a controller 230 for further processing.

On the DL, at AP 110, a TX data processor 210 receives traffic data from a data source 208 for $N_{DL}$ wireless stations scheduled for downlink transmission, control data from a controller 230, and possibly other data from a scheduler 234. The various types of data may be sent on different transport channels. TX data processor 210 processes (e.g., encodes, interleaves, and modulates) the traffic data for each wireless station based on the rate selected for that wireless station. TX data processor 210 provides $N_{DL}$ DL data symbol streams for the $N_{DL}$ wireless stations. A TX spatial processor 220 performs spatial processing (such as a precoding or beamforming, as described in the present disclosure) on the $N_{DL}$ DL data symbol streams, and provides $N_{ap}$ transmit symbol streams for the $N_{ap}$ antennas. Each transceiver 222 receives and processes a respective transmit symbol stream to generate a DL signal. $N_{ap}$ transceivers 222 providing $N_{ap}$ DL signals for transmission from $N_{ap}$ antennas 224 to the wireless STAs.

At each wireless STA 120, $N_{sta,m}$ antennas 252 receive the $N_{ap}$ DL signals from access point 110. Each transceiver 254 processes a received signal from an associated antenna 252 and provides a received symbol stream. An RX spatial processor 260 performs receiver spatial processing on $N_{sta,m}$ received symbol streams from $N_{sta,m}$ transceiver 254 and provides a recovered DL data symbol stream for the wireless station. The receiver spatial processing is performed in accordance with the CCMI, MMSE or some other technique. An RX data processor 270 processes (e.g., demodulates, deinterleaves and decodes) the recovered DL data symbol stream to obtain decoded data for the wireless station.

At each wireless STA 120, a channel estimator 278 estimates the DL channel response and provides DL channel estimates, which may include channel gain estimates, SNR estimates, noise variance and so on. Similarly, a channel estimator 228 estimates the UL channel response and provides UL channel estimates. Controller 280 for each wireless STA typically derives the spatial filter matrix for the wireless station based on the downlink channel response matrix $H_{dn,m}$ for that wireless station. Controller 230 derives the spatial filter matrix for the AP based on the effective UL channel response matrix $H_{up,eff}$. Controller 280 for each wireless STA may send feedback information (e.g., the downlink and/or uplink eigenvectors, eigenvalues, SNR estimates, and so on) to the AP. Controllers 230 and 280 also control the operation of various processing units at AP 110 and wireless STA 120, respectively.

Figure 3:
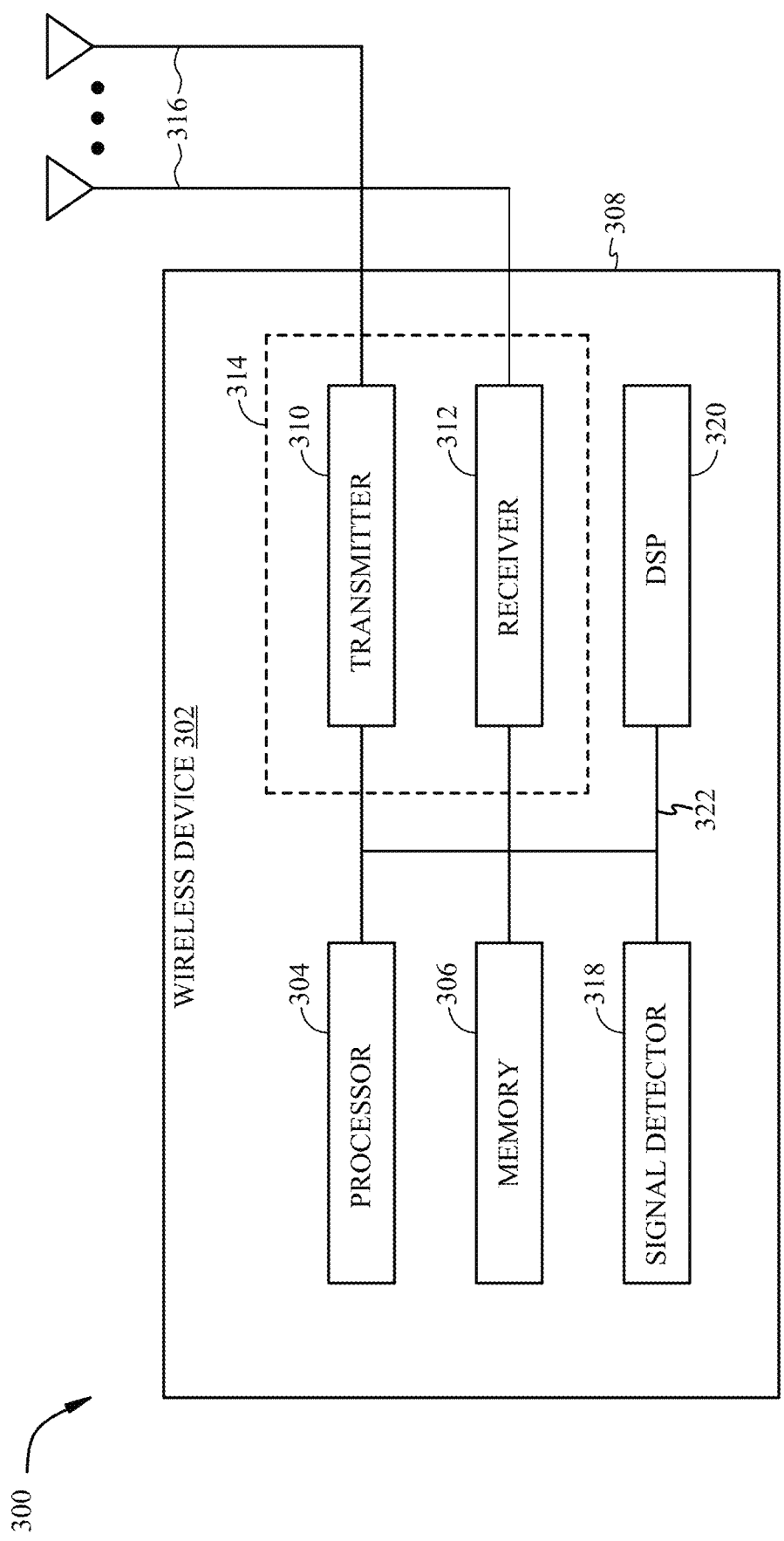
FIG. 3 illustrates an example wireless device, in accordance with certain aspects of the present disclosure.

FIG. 3 illustrates various components that may be utilized in a wireless device 302 that may be employed within system 100, in accordance with certain aspects of the present disclosure. Wireless device 302 is an example of a device that may be configured to implement the various methods described herein. Wireless device 302 may be an AP 110 or a user terminal.

Wireless device 302 may include a processor 304 which controls operation of wireless device 302. Processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

Wireless device 302 may also include a housing 308 that may include a transmitter 310 and a receiver 312 to allow transmission and reception of data between the wireless device 302 and a remote location. Transmitter 310 and receiver 312 may be combined into a transceiver 314. A single or a plurality of transmit antennas 316 may be attached to the housing 308 and electrically coupled to the transceiver 314. Wireless device 302 may also include (not shown) multiple transmitters, multiple receivers, and multiple transceivers.

Wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. Wireless device 302 may also include a digital signal processor (DSP) 320 for use in processing signals.

The various components of wireless device 302 may be coupled together by a bus system 322, which may include a power bus, a control signal bus, and a status signal bus in addition to a data bus.

Certain aspects of the present disclosure are directed to apparatus and techniques for implementing multi-link communications. For example, certain aspects provide techniques for managing data flows for across multiple links by an MLD. Multiple bands may be implemented for wireless devices. For example, a wireless device may be able to support at least one of a 2.4 GHz band, a 5 GHz band or a 6 GHz band and operate over more than one link spread over these bands. With multi-link communications, data flows may be transmitted across multiple wireless links which may be associated with different bands.

Example Mechanisms for Protecting (Re-Association) Transmissions

Aspects of the present disclosure may utilize a certain mechanism, referred to as Pre Association Security Negotiation (PASN), to generate a set of keys used to encrypt (re-)association response or request messages. As will be described in greater detail below, in addition or as an alternative to encrypting (re-)association messages, portions of PASN messages may be encrypted.

As the name implies, PASN generally refers to a protocol that may be used to establish security association and allow some degree of protection to wireless frames before association. PASN may provide Authentication, Key Management, Encryption and Message Integrity in an unassociated state.

Figure 4:
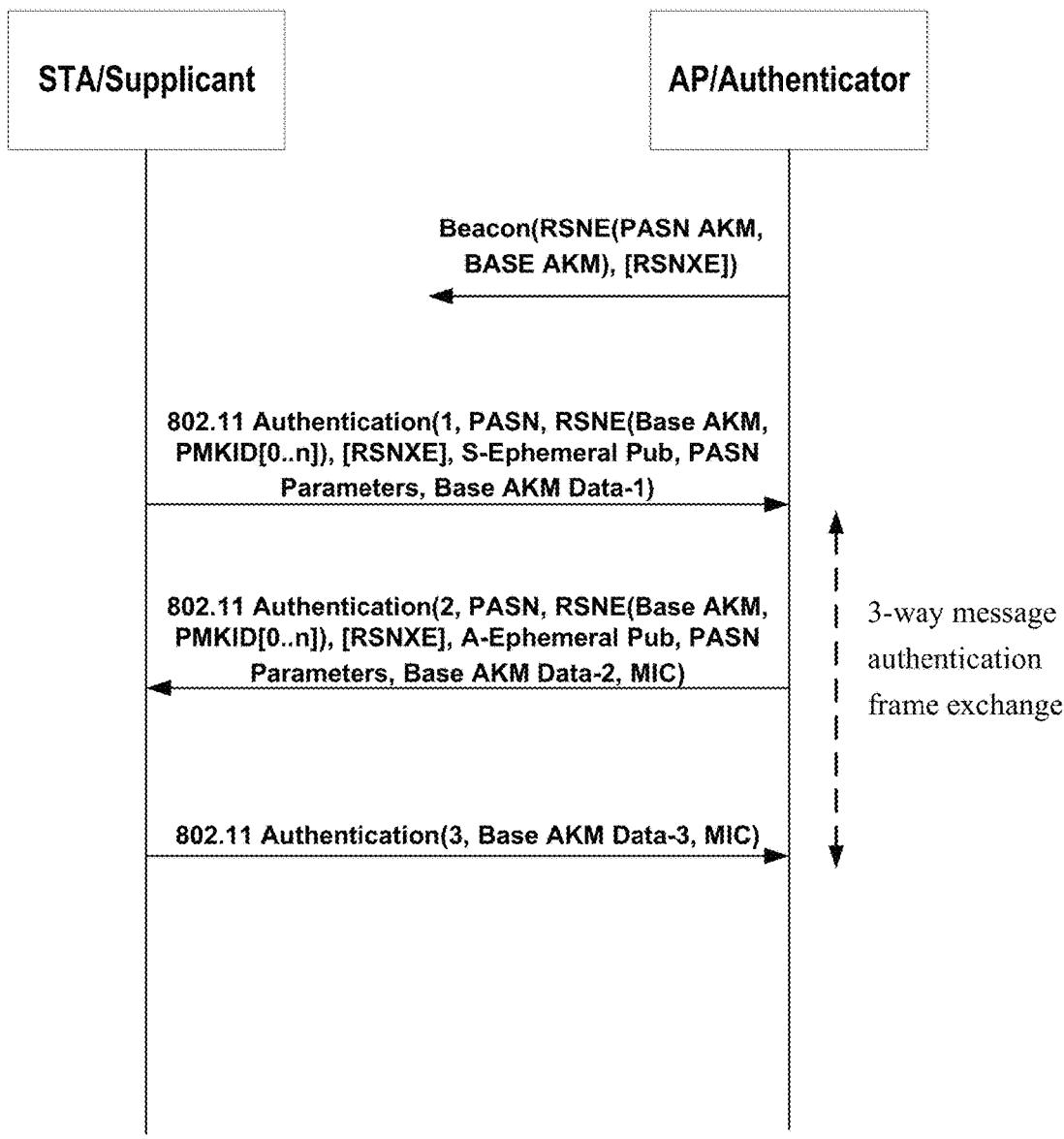
FIG. 4 is a call flow diagram illustrating an example authentication procedure.

FIG. 4 illustrates an example PASN call flow. As illustrated, PASN may establish (set up) a Pairwise Transient Key Security Association (PTKSA) using a 3-message authentication frame exchange. The PASN procedure may be initiated by the statin (STA), for example, after detecting a beacon transmitted by the AP (that indicates the AP supports PASN). PASN may enable tunneling of messages based on a base authentication and key management (Base AKM) function. This may amount to a Robust Security Network Association (RSNA) authentication protocol if Pairwise Master Key Security Association PMKSA exists for the AKM specified in the Base AKM. Alternatively, this may amount to a non-RSNA protocol when there is no PMKSA and the corresponding Base AKM used with it.

If PMKSA exists, the cached PMKSA may be used to generate the PASN PTKSA. Otherwise, the PMKSA established by the AKM specified in the Base AKM may be used to generate PASN PTKSA. The base AKM can be one of the followings (e.g., as specified in 802.11az):

a Fast Initial Link Setup (FILS) shared key;
Simultaneous Authentication of Equals (SAE);
fast transition (FT); or
PASN (non-RSNA, no mutual authentication).

As illustrated in FIG. 4, a successful PASN exchange may result in establishment of PTKSA using the ephemeral keys and PMK from the Base AKM (if any). If the AKM is other than PASN AKM, then:

PMK=the pairwise master key for the base AKM.

If the base AKM is PASN AKM (i.e. the PASN PTKSA is being setup without mutual authentication in a non-RSN), then:

PMK="PMKz" padded with 28 0 s.

Key Confirmation Key (KCK) may be used to protect the 2nd and 3rd PASN frames (generate the message integrity checks (MICs)). A transient key (TK) may be used for pairwise cipher of subsequent unicast messages. KDK may be used to secure the long training field (LTF) of a frame.

Example Mechanisms for Protecting (Re-Association) Transmissions

Aspects of the present disclosure provide apparatus, methods, processing systems, and computer readable mediums for protecting various types of messages transmitted in certain procedures. For example, the mechanisms provided herein may help protect information included in authentication messages, association messages, and re-association messages.

As noted above, one potential issue with conventional association and re-association processes is that some elements included in the requests and responses may be sent unencrypted, which may represent a significant vulnerability. This vulnerability could result in potentially deleterious consequences if unencrypted data in these messages results in a leaked privacy information. Aspects of the present disclosure may help address this vulnerability. For example, by encrypting data in various request, response, or authentication messages, finger printing by a malicious actor may be prevented, thus thwarting a possible attack. As will be described in greater detail below, the techniques may utilize any suitable type of encryption scheme (e.g., symmetric key encryption) using any suitable keys.

Figure 5:
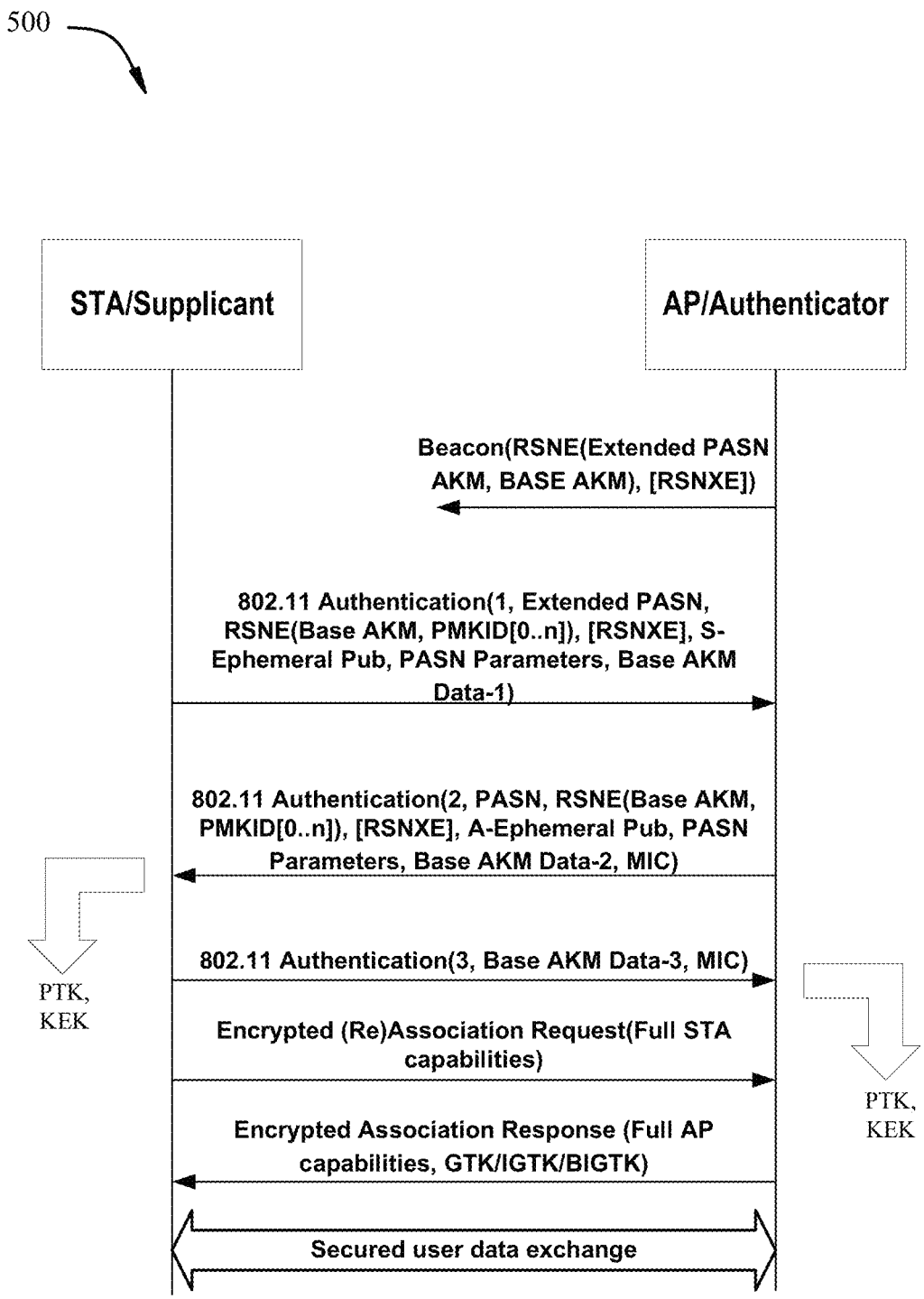
FIG. 5 is a call flow diagram illustrating an example association procedure, in accordance with aspects of the present disclosure.

As illustrated in FIG. 5, in some cases, what may be considered an extended PASN procedure may be supported and used to generate a set of (TK) keys used to encrypt association or re-association request and response messages (collectively referred herein to as (re-)association messages).

As illustrated, an AP may advertise support of such an extended PASN, via a beacon. Upon discovering this support, a STA may initiate an extended PASN procedure by sending an authentication message (that may also indicate that the STA supports extended PASN). The AP may then respond with its own authentication message, after which the STA may generate a set of keys (e.g., PTK and KEK keys). The AP may then send another authentication message, which amounts to the third of the 3-way handshake messages, after which the AP and STA are in synch on the (PTK and KEK) keys.

As illustrated, the STA may then use these keys to encrypt a (Re)Association message, thereby protecting the elements contained therein. Similarly, the AP may use the keys to encrypt the (Re)Association response that delivers a second set of keys. This second set of keys may include Group Transient Key (GTK), an Integrity Group Transient Key (IGTK), and/or Beacon Integrity Group Transient Key (BIGTK), which may be used for secure subsequent data exchange between the STA and AP.

In this manner, PASN may be extended to generate TKs for encryption of (Re)Association request and response messages. This extended PASN may effectively replace conventional key derivation function of the 4-way handshake. A PASN may have a limited set of allowed parameters. As a result, each device may look relatively similar, which may help avoid finger printing of the elements.

In some cases, negotiation (via the extended PASN) procedure may involve a robust security network element (RSNE) or extended RSNE (XRSNE) during encrypted (Re)Association request and response messages. As illustrated above, the encrypted (Re)Association response may deliver (GTK/IGKT/BIGTK) keys, while the PTKSA generated from the extended PASN for association is used for the encryption.

One potential benefit to the approach proposed herein is that different AKMs may be supported. This may help enables a relatively normal data connectivity at the completion of the association with all AKMs. This approach may help addresses some relatively rare ("corner") cases with retransmission of 4-way handshake messages and may provide a relatively clean separation of "actual" authentication and association functionality.

FIGS. 6A and FIG. 6B illustrate example AKMs that may be supported. As illustrated in FIG. 6A, supported AKMs may include a Pairwise Master Key Security Association (PMKSA) based AKM, a Simultaneous Authentication of Equals (SAE) based AKM, a Fast Initial Link Setup (FILS) based AKM, and a fast transition (FT) based AKM.

As illustrated in FIG. 6B, supported AKMs may also include an Opportunistic Wireless Encryption (OWE) based AKM, an Extensible Authentication Protocol (EAP) based AKM, and a Pre-Shared Key (PSK) based AKM. In the case of an EAP based AKM, EAP may be used in Authentication frames to derive PMKSA and PASN (PMKSA), which may be used to encrypt (re)association request and response messages, the latter of which may be used to deliver keys (GTK/IGTK/BIGTK). This may use a new Authentication frame algorithm and encapsulate the payload of the EAPOL frames (used today only as Data frames only). There are various options for reauthentication and rekeying during an association (e.g., whether to use EAPOL frames as Data frames or Authentication frames). Using authentication frames may be cleaner and may help avoid certain synchronization issues with 4-way handshake, but may not allow encryption of the EAP reauthentication exchange.

In some cases, (Re)Association messages may be encrypted using Counter Mode CBC-MAC Protocol (CCMP) or Galois/Counter Mode Protocol (GCMP) as they may be used with protected management frames (PMF), but may also use TKs. As described above, GTK/IGTK/BIGTK may be delivered as IEs inside the encrypted (Re)Association Response. If operating in multi-link operation (MLO) mode, a basic service set ID (BSSID) may be replaced with an AP MLD MAC address with non-AP multi link device (MLD) MAC address.

In some cases, an extended PASN procedure may use a new authentication algorithm to distinguish from the current PASN. For example, KEK may be added in PASN keys generation to allow moving to full association without having to do a new 4-way handshake to derive full PTK. In some cases, the extended PASN-derived PTKSA may be allowed to be used as the association-PTKSA-for-RSNA.

Figure 7:
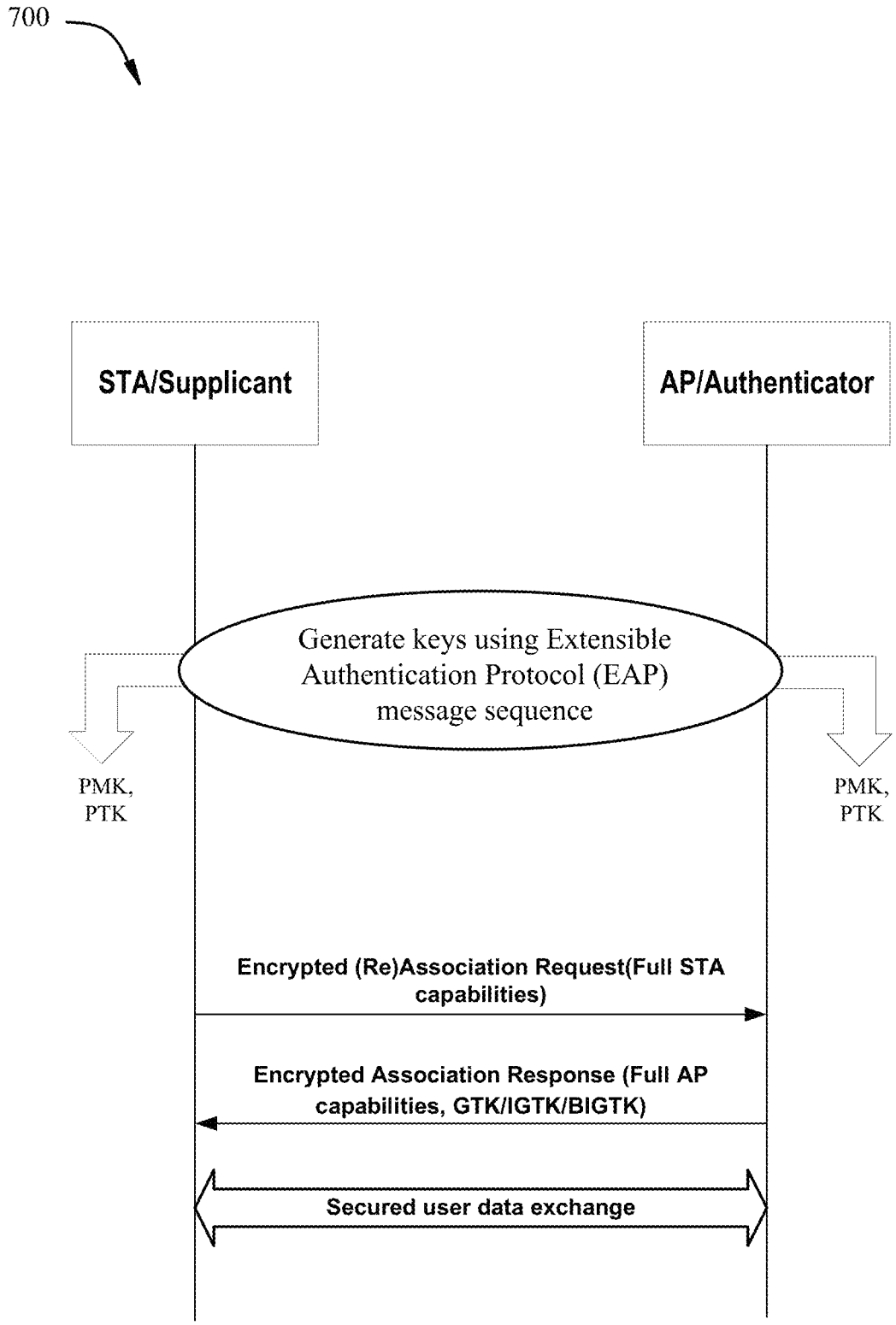
FIG. 7 is a call flow diagram illustrating another example association procedure, in accordance with aspects of the present disclosure.

As illustrated in FIG. 7, in some cases, rather than using (extended) PASN to generate keys for encrypting (Re) Association messages, keys may be generated using an Extensible Authentication Protocol (EAP) message sequence. For example, this sequence may be a conventional EAP message sequence, for example, using 802.11 Open Authentication request and response frames, and association request and response frames. In some cases, this EAP frame exchange (data frames) may be used to generate PMK, while a 4-way handshake (data frames) may be used to generate PTK. The STA may use the keys to encrypt the (Re) Association request, while the AP may use the keys to encrypt the (Re)Association Response.

Figure 8:
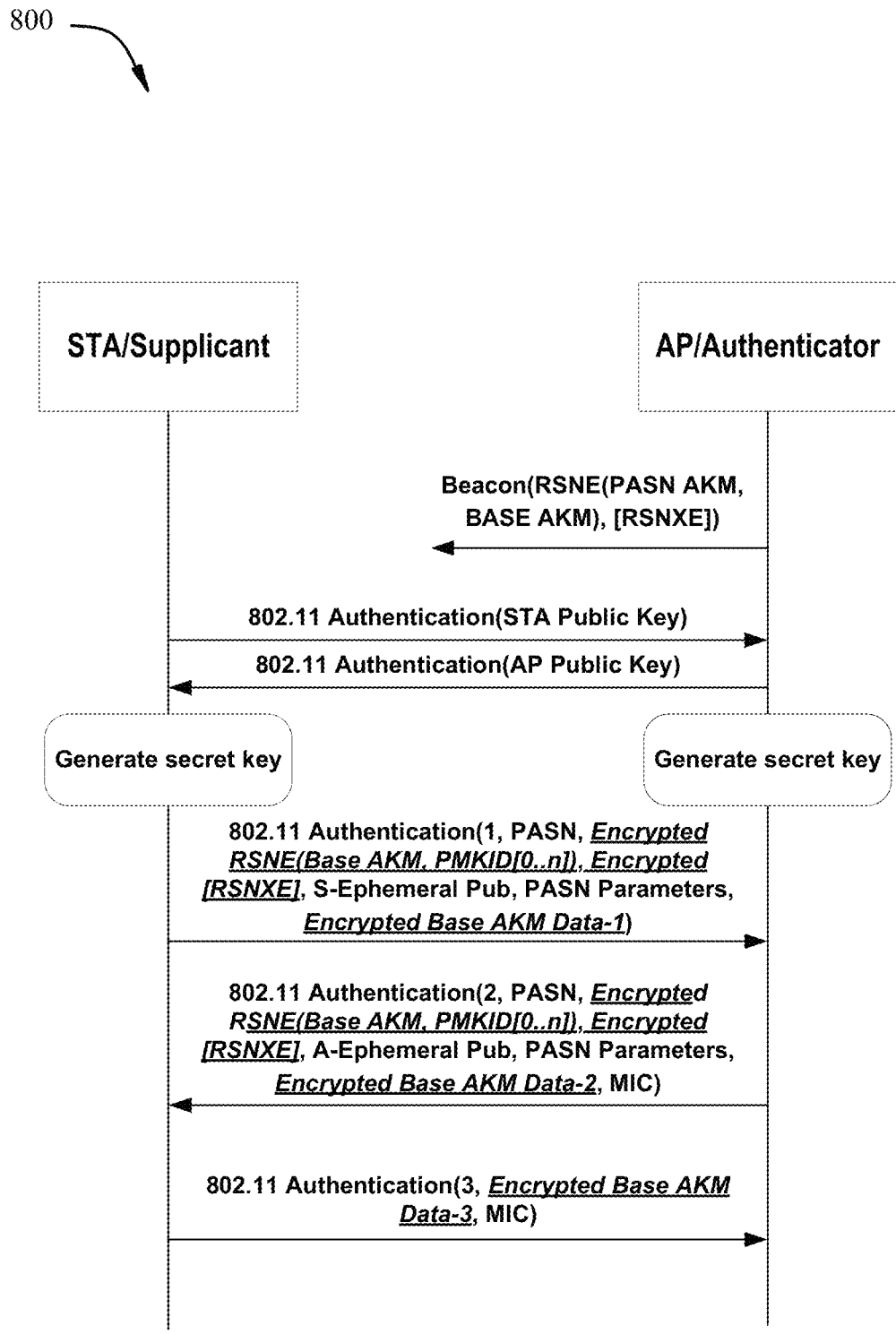
FIG. 8 is a call flow diagram illustrating an example authentication procedure, in accordance with aspects of the present disclosure.

As illustrated in FIG. 8, certain payload of the PASN authentication messages may be encrypted. For example, a two additional messages may be exchanged (to exchange a STA public key and AP public key) in addition to the 3-way message exchange shown in FIG. 4. This 5-Way message exchange may allow the portions of the (conventional 3-way) authentication messages to be encrypted, which may add to security. For example, the public key exchange (e.g., a Diffie Hellman key exchange) may allow the generation of secret keys used to encrypt one or more of: a robust security network element (RSNE) or an extended RSNE (XRSNE) included as payload in the authentication message(s). In addition or as an alternative, the secret keys used to encrypt base authentication and key management (AKM) data included as payload in the authentication message(s).

Example Operations

Figure 9:
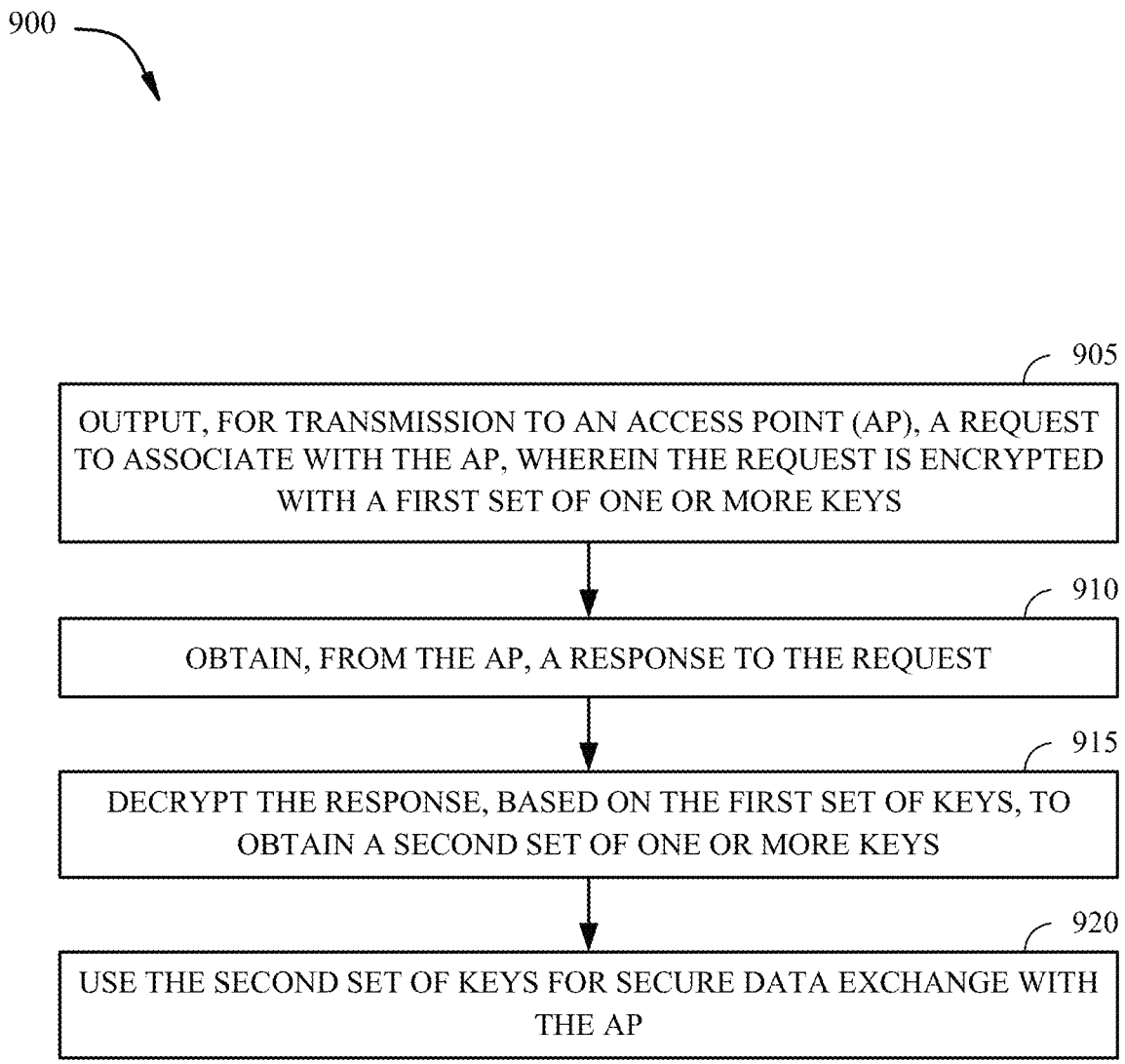
FIG. 9 illustrates example operations for wireless communications at a station, in accordance with certain aspects of the present disclosure.

FIG. 9 is a flow diagram illustrating example operations 900 for wireless communications, in accordance with certain aspects of the present disclosure. Operations 900 may be performed, for example, by a wireless node, such as a wireless station (STA).

Operations 900 begin, at 905, by outputting, for transmission to an access point (AP), a request to associate with the AP, wherein the request is encrypted with a first set of one or more keys. At 910, the STA obtains, from the AP, a response to the request. At 915, the STA decrypts the response, based on the first set of keys, to obtain a second set of one or more keys. At 920, the STA uses the second set of keys for secure data exchange with the AP.

Figure 10:
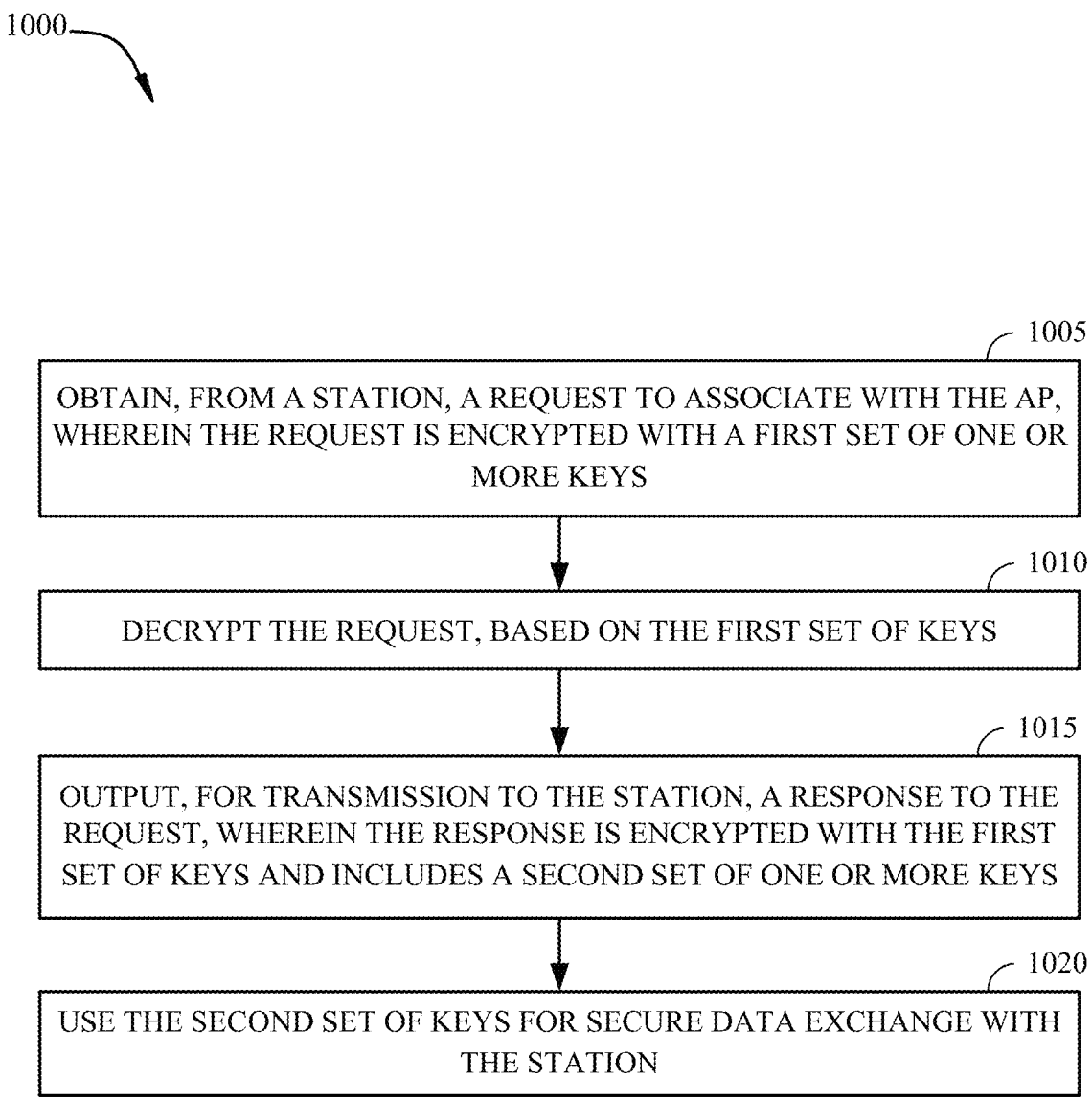
FIG. 10 illustrates example operations for wireless communications at an access point, in accordance with certain aspects of the present disclosure.

FIG. 10 is a flow diagram illustrating example operations 1000 for wireless communications, in accordance with certain aspects of the present disclosure. Operations 1000 may be performed, for example, by a wireless node, such as an access point (AP).

Operations 1000 begin, at 1005, by obtaining, from a station, a request to associate with the AP, wherein the request is encrypted with a first set of one or more keys. At 1010, the AP decrypts the request, based on the first set of keys. At 1015, the AP outputs, for transmission to the station, a response to the request, wherein the response is encrypted with the first set of keys and includes a second set of one or more keys. At 1020, the AP uses the second set of keys for secure data exchange with the station.

Figure 11:
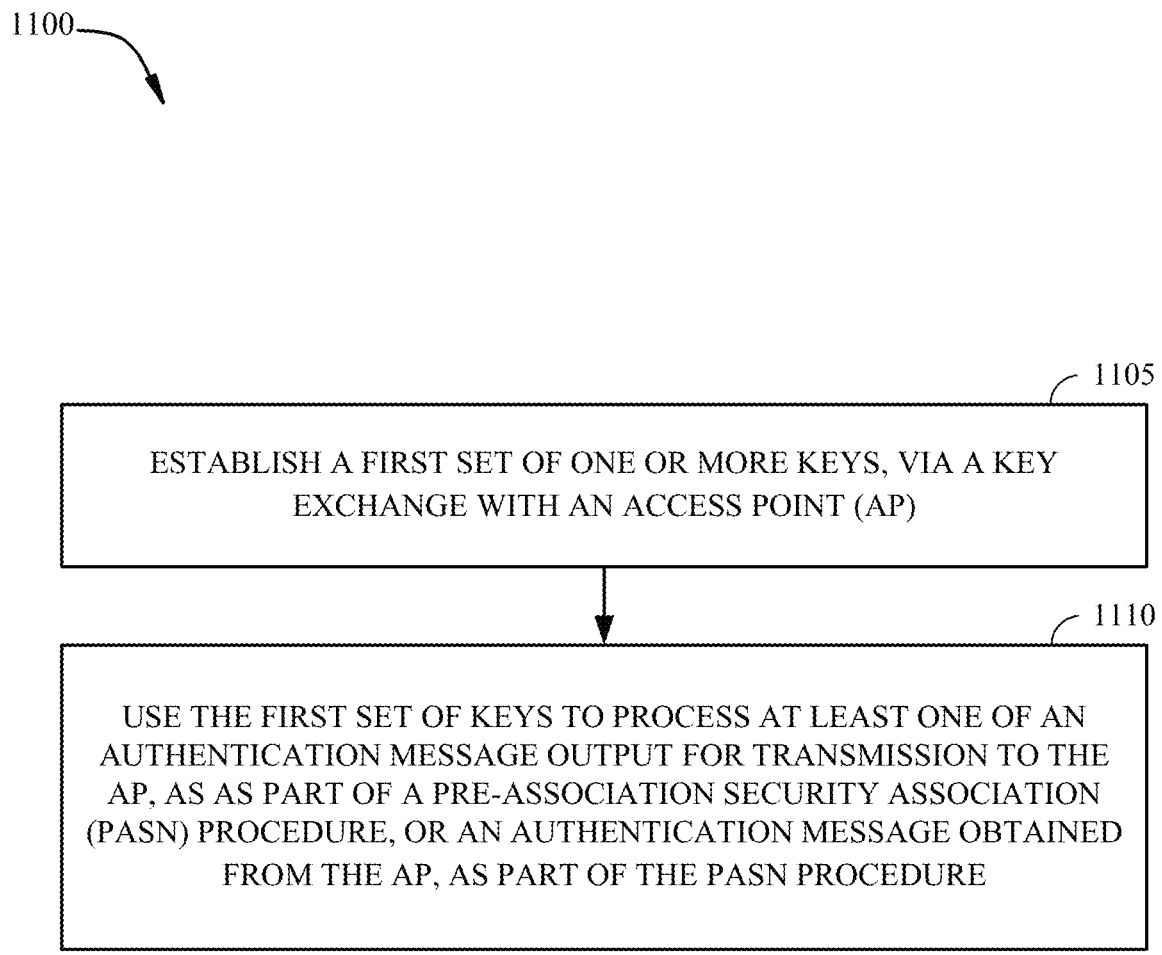
FIG. 11 illustrates example operations for wireless communications at a station, in accordance with certain aspects of the present disclosure.

FIG. 11 is a flow diagram illustrating example operations 1100 for wireless communications, in accordance with certain aspects of the present disclosure. Operations 1100 may be performed, for example, by a wireless node, such as a wireless station (STA).

Operations 1100 begin, at 1105, by establishing a first set of one or more keys, via a key exchange with an access point (AP). At 1110, the STA uses the first set of keys to process at least one of an authentication message output, for transmission to the AP, as part of a pre-association security association (PASN) procedure or an authentication message obtained from the AP, as part of the PASN procedure.

Figure 12:
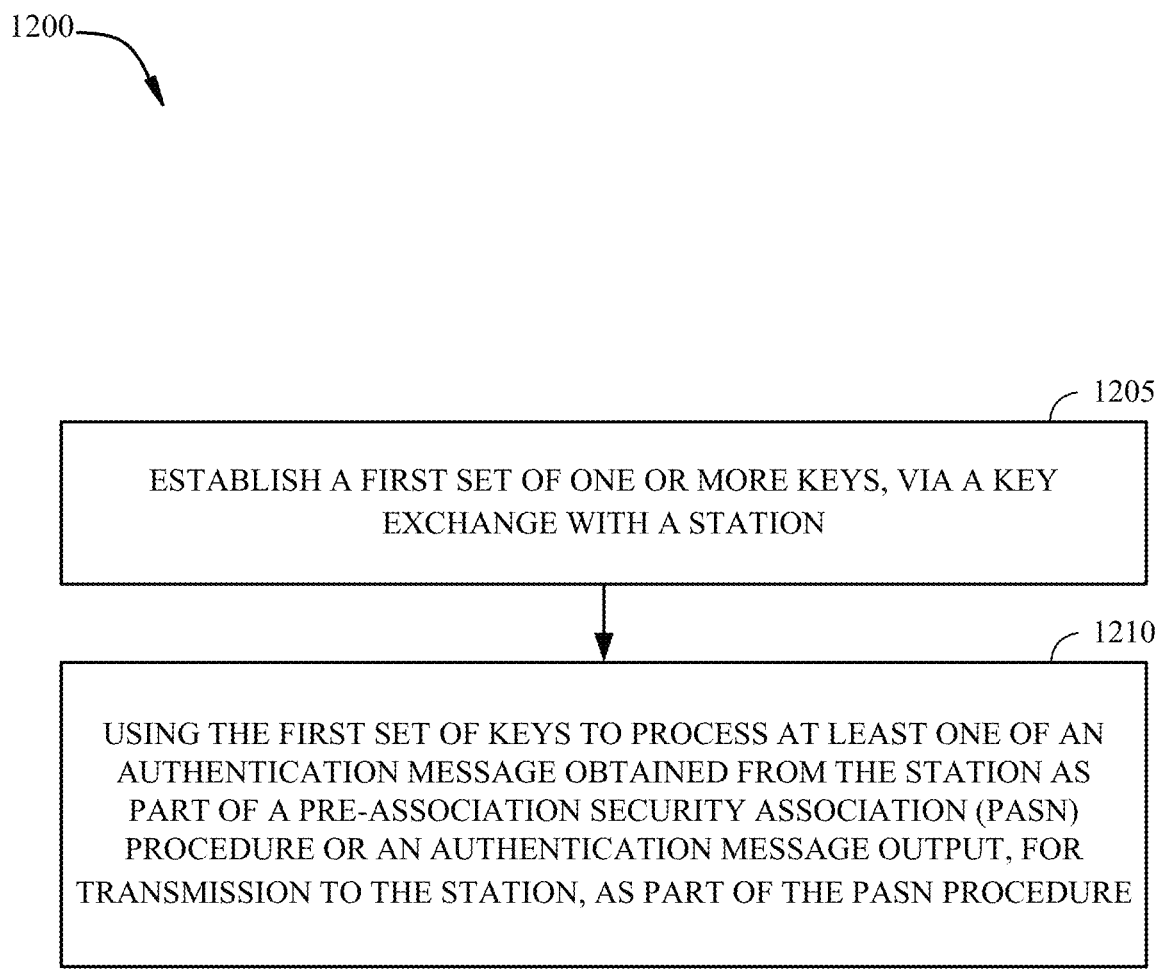
FIG. 12 illustrates example operations for wireless communications at an access point, in accordance with certain aspects of the present disclosure.

FIG. 12 is a flow diagram illustrating example operations 1200 for wireless communications, in accordance with certain aspects of the present disclosure. Operations 1200 may be performed, for example, by a wireless node, such as an access point (AP).

Operations 1200 begin, at 1205, by establishing a first set of one or more keys, via a key exchange with a station. At 1210, the AP using the first set of keys to process at least one of an authentication message obtained from the station as part of a pre-association security association (PASN) procedure or an authentication message output, for transmission to the station, as part of the PASN procedure.

The various operations of methods described above may be performed by any suitable means capable of performing the corresponding functions. The means may include various hardware or software component(s) or module(s), including, but not limited to a circuit, an application specific integrated circuit (ASIC), or processor. Generally, where there are operations illustrated in figures, those operations may have corresponding counterpart means-plus-function components with similar numbering.

Example Device

Figure 13:
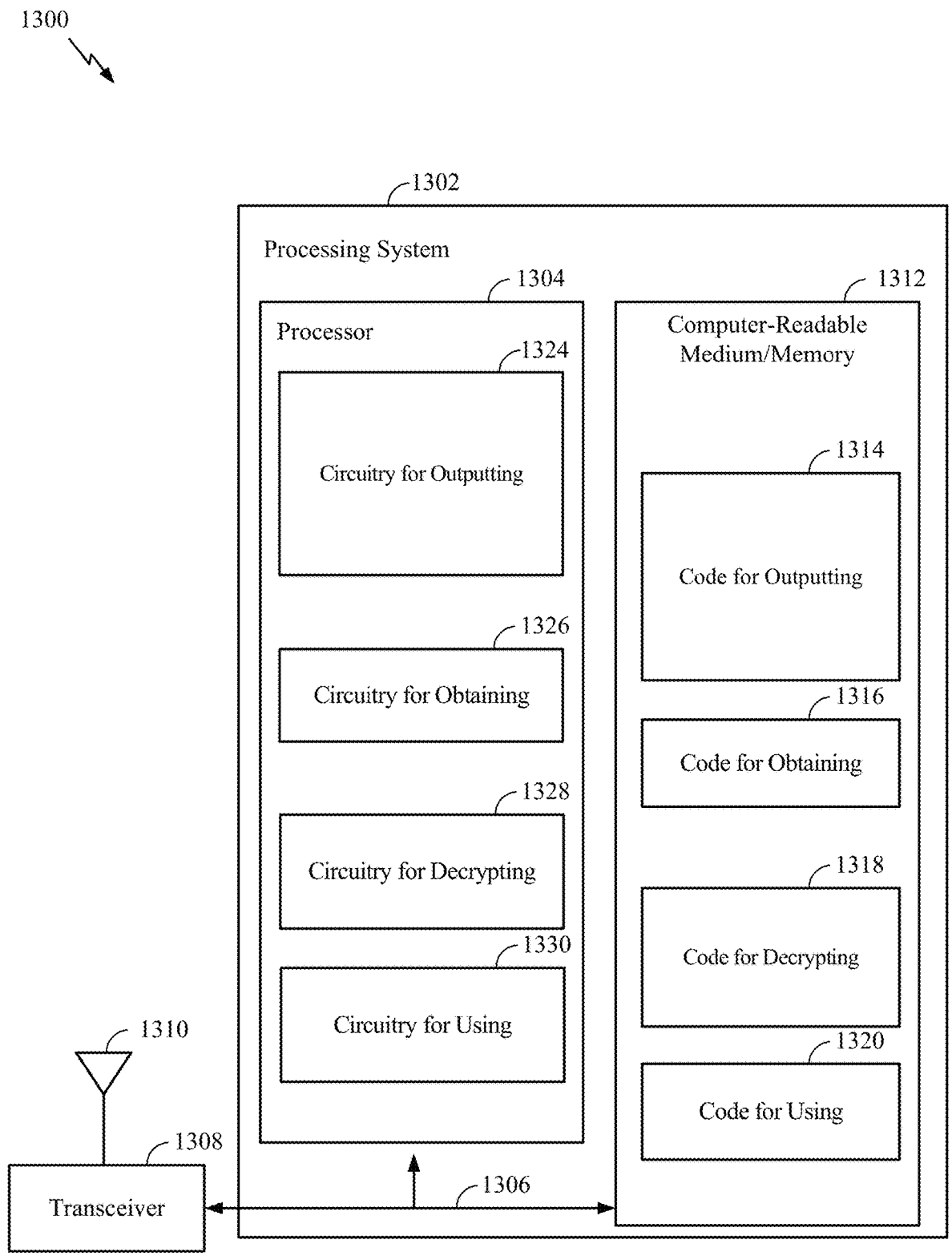
FIG. 13 illustrates example components capable of performing operations described herein.

FIG. 13 illustrates a communications device 1300 that may include various components (such as corresponding to means-plus-function components) operable, configured, or adapted to perform operations for the techniques disclosed herein, such as the operations illustrated in FIGS. 9-10.

Communications device 1300 includes a processing system 1302 coupled to a transceiver 1308 (such as a transmitter or a receiver). Transceiver 1308 is configured to transmit and receive signals for the communications device 1300 via an antenna 1310, such as the various signals as described herein. Processing system 1302 may be configured to perform processing functions for the communications device 1300, including processing signals received or to be transmitted by the communications device 1300.

Processing system 1302 includes a processor 1304 coupled to a computer-readable medium/memory 1312 via a bus 1306. In certain aspects, computer-readable medium/memory 1312 is configured to store instructions (such as computer-executable code) that when executed by processor 1304, cause processor 1304 to perform the operations illustrated in FIGS. 9-10, or other operations for performing the various techniques discussed herein.

In certain aspects, computer-readable medium/memory 1312 stores code 1314 (such as an example of means for) for outputting, code 1316 (such as an example of means for) for obtaining, code 1318 (such as an example of means for) for decrypting, and code 1320 (such as an example of means for) for using.

In certain aspects, processor 1304 has circuitry configured to implement the code stored in the computer-readable medium/memory 1312. Processor 1304 includes circuitry 1324 (such as an example of means for) for outputting, circuitry 1326 (such as an example of means for) for obtaining, code 1328 (such as an example of means for) for decrypting, and circuitry 1330 (such as an example of means for) for using.

Transceiver 1308 may provide a means for receiving information such as packets, user data, or control information associated with various information channels (such as control channels, data channels, etc.). Information may be passed on to other components of the device 1300. Transceiver 1308 may be an example of aspects of the transceiver 254 described with reference to FIG. 2. Antenna 1310 may correspond to a single antenna or a set of antennas. Transceiver 1308 may provide means for transmitting signals generated by other components of the device 1300.

Figure 14:
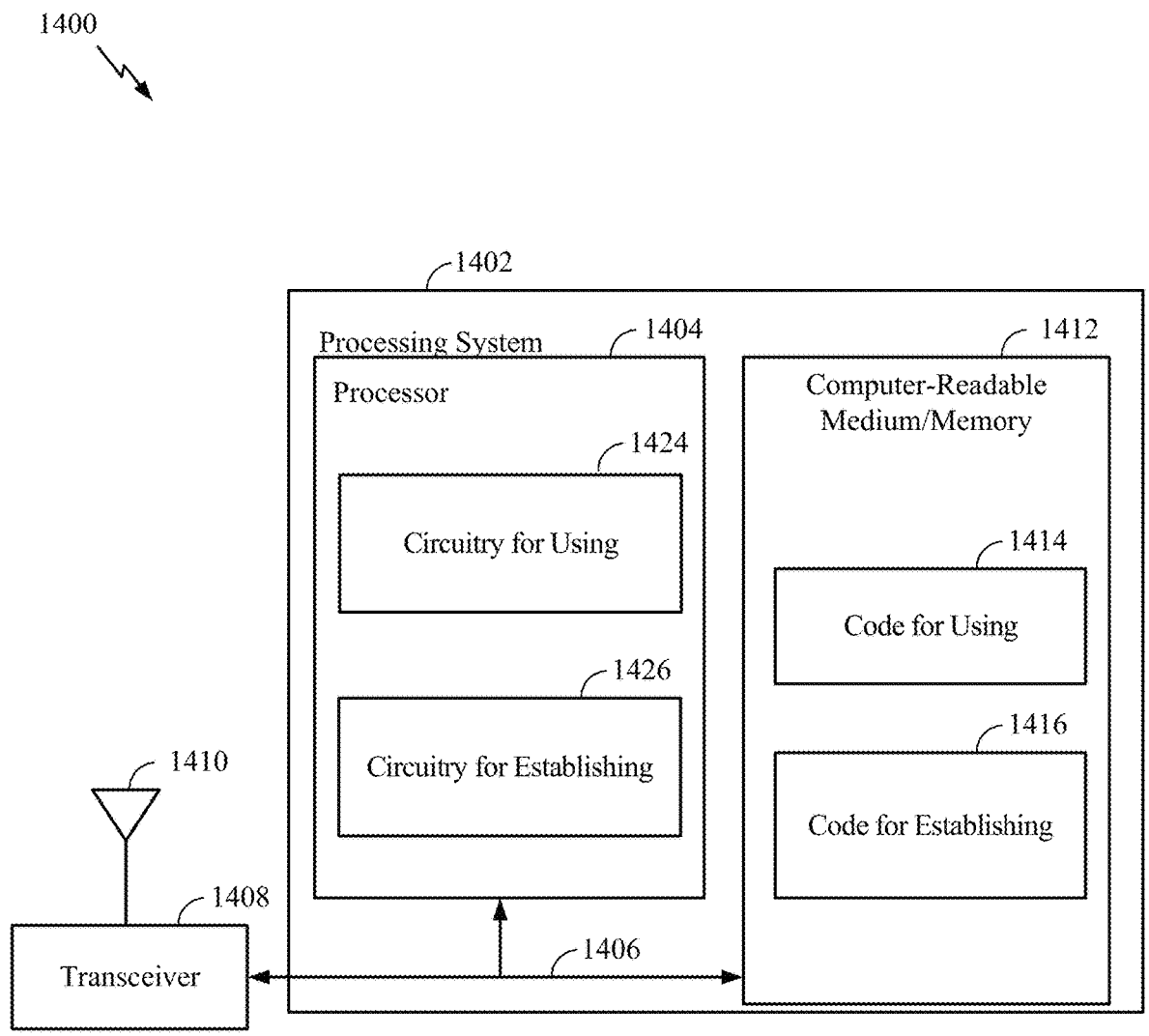
FIG. 14 illustrates example components capable of performing operations described herein.

FIG. 14 illustrates a communications device 1400 that may include various components (such as corresponding to means-plus-function components) operable, configured, or adapted to perform operations for the techniques disclosed herein, such as the operations illustrated in FIGS. 11-12.

Communications device 1400 includes a processing system 1402 coupled to a transceiver 1408 (such as a transmitter or a receiver). Transceiver 1408 is configured to transmit and receive signals for the communications device 1400 via an antenna 1410, such as the various signals as described herein. Processing system 1402 may be configured to perform processing functions for the communications device 1400, including processing signals received or to be transmitted by the communications device 1400.

Processing system 1402 includes a processor 1404 coupled to a computer-readable medium/memory 1412 via a bus 1406. In certain aspects, computer-readable medium/memory 1412 is configured to store instructions (such as computer-executable code) that when executed by processor 1404, cause processor 1404 to perform the operations illustrated in FIGS. 11-12, or other operations for performing the various techniques discussed herein.

In certain aspects, computer-readable medium/memory 1412 stores code 1414 (such as an example of means for) for using and code 1416 (such as an example of means for) for establishing.

In certain aspects, processor 1404 has circuitry configured to implement the code stored in the computer-readable medium/memory 1412. Processor 1404 includes circuitry 1424 (such as an example of means for) for using and circuitry 1426 (such as an example of means for) for establishing.

Transceiver 1408 may provide a means for receiving information such as packets, user data, or control information associated with various information channels (such as control channels, data channels, etc.). Information may be passed on to other components of the device 1400. Transceiver 1408 may be an example of aspects of the transceiver 254 described with reference to FIG. 2. Antenna 1410 may correspond to a single antenna or a set of antennas. Transceiver 1408 may provide means for transmitting signals generated by other components of the device 1400.

For example, means for transmitting (or means for outputting for transmission) may include a transmitter (such as the transmitter unit 222) or an antenna(s) 224 of AP 110 or the transmitter unit 254 or antenna(s) 252 of the STA 120 illustrated in FIG. 2. Means for receiving (or means for obtaining) may include a receiver (such as the receiver unit 222) or an antenna(s) 224 of AP 110 or the receiver unit 254 or antenna(s) 252 of STA 120 illustrated in FIG. 2. Means for communicating may include a transmitter, a receiver or both. Means for obtaining, means for encrypting, means for decrypting, means for using, and means for establishing may include a processing system, which may include one or more processors, such as the RX data processor 242, the TX data processor 210, the TX spatial processor 220, or the controller 230 of AP 110 or the RX data processor 270, the TX data processor 288, the TX spatial processor 290, or the controller 280 of STA 120 illustrated in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception. In some cases, the interface to output a frame for transmission and the interface to obtain a frame (which may be referred to as first and second interfaces herein) may be the same interface.

Example Aspects

Implementation examples are described in the following numbered aspects:

Aspect 1: A method for wireless communication at a station, comprising: outputting, for transmission to an access point (AP), a request to associate with the AP, wherein the request is encrypted with a first set of one or more keys; obtaining, from the AP, a response to the request; decrypting the response, based on the first set of keys, to obtain a second set of one or more keys; and using the second set of keys for secure data exchange with the AP.

Aspect 2: The method of Aspect 1, wherein: the AP belongs to an extended service set (ESS); the station was previously associated with another AP in the ESS; the request comprises a re-association request; and the response comprises a re-association response.

Aspect 3: The method of any one of Aspects 1-2, further comprising establishing the first set of keys via a pre-association security association (PASN) procedure.

Aspect 4: The method of Aspect 3, further comprising: obtaining, from the AP, a first indication of a capability of the AP to support establishing the first set of keys via the pre-association security association (PASN) procedure; and outputting, for transmission to the AP as part of the PASN procedure, a second indication of a capability of the station to support establishing the first set of keys via the pre-association security association (PASN) procedure.

Aspect 5: The method of any one of Aspects 1-4, further comprising encrypting the request, based on the first set of keys, using an authentication and key management (AKM) function.

Aspect 6: The method of Aspect 5, wherein the AKM function comprises: a Pairwise Master Key Security Association (PMKSA) based AKM function; a Simultaneous Authentication of Equals (SAE) based AKM function; a Fast Initial Link Setup (FILS) based AKM function; a fast transition (FT) based AKM function; an Opportunistic Wireless Encryption (OWE) based AKM function; an Extensible Authentication Protocol (EAP) based AKM function; or a Pre-Shared Key (PSK) based AKM function.

Aspect 7: The method of any one of Aspects 1-6, wherein the first set of keys comprises at least one of a Pairwise Transient Key (PTK) or a Key Encryption Key (KEK).

Aspect 8: The method of any one of Aspects 1-7, wherein the second set of keys comprises at least one of a Group Transient Key (GTK), an Integrity Group Transient Key (IGTK), or a Beacon Integrity Group Transient Key (BIGTK).

Aspect 9: The method of any one of Aspects 1-8, further comprising establishing the first set of keys via: an extensible authentication protocol (EAP) procedure; and a four-way handshake procedure.

Aspect 10: The method of Aspect 9, wherein establishing the first set of keys comprises: generating a pairwise master key (PMK) via the EAP procedure; and generating a Pairwise Transient Key (PTK), from the PMK, via the four-way handshake procedure.

Aspect 11: A method for wireless communication at an access point (AP), comprising: obtaining, from a station, a request to associate with the AP, wherein the request is encrypted with a first set of one or more keys; decrypting the request, based on the first set of keys; outputting, for transmission to the station, a response to the request, wherein the response is encrypted with the first set of keys and includes a second set of one or more keys; and using the second set of keys for secure data exchange with the station.

Aspect 12: The method of Aspect 11, wherein: the AP belongs to an extended service set (ESS); the station was previously associated with another AP in the ESS; the request comprises a re-association request; and the response comprises a re-association response.

Aspect 13: The method of any one of Aspects 11-12, further comprising establishing the first set of keys via a pre-association security association (PASN) procedure.

Aspect 14: The method of Aspect 13, further comprising: outputting, for transmission to the station, a first indication of a capability of the AP to support establishing the first set of keys via the pre-association security association (PASN) procedure; and obtaining, from the station as part of the PASN procedure, a second indication of a capability of the station to support establishing the first set of keys via the pre-association security association (PASN) procedure.

Aspect 15: The method of any one of Aspects 11-14, further comprising encrypting the response, based on the first set of keys, using an authentication and key management (AKM) function.

Aspect 16: The method of Aspect 15, wherein the AKM function comprises: a Pairwise Master Key Security Association (PMKSA) based AKM function; a Simultaneous Authentication of Equals (SAE) based AKM function; a Fast Initial Link Setup (FILS) based AKM function; a fast transition (FT) based AKM function; an Opportunistic Wireless Encryption (OWE) based AKM function; an Extensible Authentication Protocol (EAP) based AKM function; or a Pre-Shared Key (PSK) based AKM function.

Aspect 17: The method of any one of Aspects 11-16, wherein the first set of keys comprises at least one of a Pairwise Transient Key (PTK) or a Key Encryption Key (KEK).

Aspect 18: The method of any one of Aspects 11-17, wherein the second set of keys comprises at least one of a Group Transient Key (GTK), an Integrity Group Transient Key (IGTK), or a Beacon Integrity Group Transient Key (BIGTK).

Aspect 19: The method of any one of Aspects 11-18, further comprising establishing the first set of keys via: an extensible authentication protocol (EAP) procedure; and a four-way handshake procedure.

Aspect 20: The method of Aspect 19, wherein establishing the first set of keys comprises: generating a pairwise master key (PMK) via the EAP procedure; and generating a Pairwise Transient Key (PTK), from the PMK, via the four-way handshake procedure.

Aspect 21: A method for wireless communication at a station, comprising: establishing a first set of one or more keys, via a key exchange with an access point (AP); and using the first set of keys to process at least one of an authentication message output, for transmission to the AP, as part of a pre-association security association (PASN) procedure or an authentication message obtained from the AP, as part of the PASN procedure.

Aspect 22: The method of Aspect 21, wherein the key exchange comprises a Diffie Hellman key exchange.

Aspect 23: The method of any one of Aspects 21-22, wherein the first set of keys is used to encrypt at least one of: a robust security network element (RSNE) included as payload in the authentication message outputted for transmission to the station; or an extended RSNE (XRSNE) included as payload in the authentication message outputted for transmission to the station.

Aspect 24: The method of any one of Aspects 21-24, wherein the first set of keys is used to encrypt at least one of: a robust security network element (RSNE) or extended RSNE (XRSNE) included as payload in the authentication message obtained from the station.

Aspect 25: The method of any one of Aspects 21-24, wherein the first set of keys is used to encrypt: base authentication and key management (AKM) data included as payload in the authentication message outputted for transmission to the station.

Aspect 26: The method of any one of Aspects 21-25, wherein the first set of keys is used to encrypt: base authentication and key management (AKM) data included as payload in the authentication message obtained from the station.

Aspect 27: A method for wireless communication at an access point (AP), comprising: establishing a first set of one or more keys, via a key exchange with a station; and using the first set of keys to process at least one of an authentication message obtained from the station as part of a pre-association security association (PASN) procedure or an authentication message output, for transmission to the station, as part of the PASN procedure.

Aspect 28: The method of Aspect 27, wherein the key exchange comprises a Diffie Hellman key exchange.

Aspect 29: The method of any one of Aspects 27-28, wherein the first set of keys is used to decrypt at least one of: a robust security network element (RSNE) or extended RSNE (XRSNE) included as payload in the authentication message obtained from the station.

Aspect 30: The method of any one of Aspects 27-29, wherein the first set of keys is used to decrypt at least one of: a robust security network element (RSNE) or extended RSNE (XRSNE) included as payload in the authentication message obtained from the station.

Aspect 31: The method of any one of Aspects 27-30, wherein the first set of keys is used to decrypt: base authentication and key management (AKM) data included as payload in the authentication message obtained from the station.

Aspect 32: The method of any one of Aspects 27-31, wherein the first set of keys is used to decrypt: base authentication and key management (AKM) data included as payload in the authentication message obtained from the station.

Aspect 33: An apparatus for wireless communications, comprising: a memory comprising instructions; and one or more processors configured to execute the instructions and cause the apparatus to perform a method in accordance with any one of Aspects 1-32.

Aspect 34: An apparatus for wireless communications, comprising means for performing a method in accordance with any one of Aspects 1-32.

Aspect 35: A non-transitory computer-readable medium comprising instructions that, when executed by an apparatus, cause the apparatus to perform a method in accordance with any one of Aspects 1-32.

Aspect 36: A station, comprising: at least one transceiver; a memory comprising instructions; and one or more processors configured to execute the instructions and cause the station to perform a method in accordance with any one of Aspects 1-10, wherein the at least one transceiver is configured to transmit the request.

Aspect 37: A station, comprising: at least one transceiver; a memory comprising instructions; and one or more processors configured to execute the instructions and cause the station to perform a method in accordance with any one of Aspects 21-26, wherein the at least one transceiver is configured to at least one of transmit or receive the authentication message as part of the PASN procedure.

Aspect 38: An access point (AP), comprising: at least one transceiver; a memory comprising instructions; and one or more processors configured to execute the instructions and cause the access point to perform a method in accordance with any one of Aspects 11-20, wherein the at least one transceiver is configured to receive the request.

Aspect 39: An access point (AP), comprising: at least one transceiver; a memory comprising instructions; and one or more processors configured to execute the instructions and cause the access point to perform a method in accordance with any one of Aspects 27-32, wherein the at least one transceiver is configured to at least one of transmit or receive the authentication message as part of the PASN procedure.

Additional Considerations

As used herein, the term "determining" encompasses a wide variety of actions. For example, "determining" may include calculating, computing, processing, deriving, investigating, looking up (such as looking up in a table, a database or another data structure), ascertaining and the like. Also, "determining" may include receiving (such as receiving information), accessing (such as accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

The invention claimed is:

1. An apparatus for wireless communications, comprising:
a memory comprising instructions; and
one or more processors configured to execute the instructions and cause the apparatus to:
obtain, from an access point (AP), a first indication of a capability of the AP to support establishing a first set of one or more keys via an extended pre-association security association (PASN) procedure;
establish the first set of one or more keys via the extended PASN procedure, wherein the first set of one or more keys includes a Pairwise Transient Key (PTK) and a Key Encryption Key (KEK);
output, for transmission to the AP, a request to associate with the AP, wherein the request is encrypted with the first set of one or more keys;
obtain, from the AP, a response to the request;
decrypt the response, based on the first set of keys, to obtain a second set of one or more keys; and
use the second set of keys for secure data exchange with the AP.

2. The apparatus of claim 1, wherein:
the AP belongs to an extended service set (ESS);
the apparatus was previously associated with another AP in the ESS;
the request comprises a re-association request; and
the response comprises a re-association response.

3. The apparatus of claim 1, wherein the one or more processors are further configured to execute the instructions and cause the apparatus to:
output, for transmission to the AP as part of the PASN procedure, a second indication of a capability of the apparatus to support establishing the first set of keys via the pre-association security association (PASN) procedure.

4. The apparatus of claim 1, wherein the one or more processors are further configured to execute the instructions and cause the apparatus to encrypt the request, based on the first set of keys, using an authentication and key management (AKM) function.

5. The apparatus of claim 4, wherein the AKM function comprises:
a Pairwise Master Key Security Association (PMKSA) based AKM function;
a Simultaneous Authentication of Equals (SAE) based AKM function;
a Fast Initial Link Setup (FILS) based AKM function;
a fast transition (FT) based AKM function;
an Opportunistic Wireless Encryption (OWE) based AKM function;
an Extensible Authentication Protocol (EAP) based AKM function; or
a Pre-Shared Key (PSK) based AKM function.

6. The apparatus of claim 1, wherein the second set of keys comprises at least one of a Group Transient Key (GTK), an Integrity Group Transient Key (IGTK), or a Beacon Integrity Group Transient Key (BIGTK).

7. The apparatus of claim 1, wherein the one or more processors are further configured to execute the instructions and cause the apparatus to establish the first set of keys via:
  an extensible authentication protocol (EAP) procedure; and
  a four-way handshake procedure.

8. The apparatus of claim 7, wherein, in order to establish the first set of keys, the one or more processors are further configured to execute the instructions and cause the apparatus to:
  generate a pairwise master key (PMK) via the EAP procedure; and
  generate the PTK, from the PMK, via the four-way handshake procedure.

9. The apparatus of claim 1, further comprising at least one transceiver configured to at least one of transmit the request or receive the response, wherein the apparatus is configured as a wireless station.

10. An apparatus for wireless communications, comprising:
  a memory comprising instructions; and
  one or more processors configured to execute the instructions and cause the apparatus to:
    output, for transmission to a station, a first indication of a capability of the apparatus to support establishing a first set of one or more keys via an extended pre-association security association (PASN) procedure;
    establish the first set of one or more keys via the extended PASN procedure, wherein the first set of one or more keys includes a Pairwise Transient Key (PTK) and a Key Encryption Key (KEK);
    obtain, from the station, a request to associate with the apparatus wherein the request is encrypted with the first set of one or more keys;
    decrypt the request, based on the first set of keys;
    output, for transmission to the station, a response to the request, wherein the response is encrypted with the first set of keys and includes a second set of one or more keys; and
    use the second set of keys for secure data exchange with the station.

11. The apparatus of claim 10, wherein:
  the apparatus belongs to an extended service set (ESS);
  the station was previously associated with another apparatus in the ESS;
  the request comprises a re-association request; and
  the response comprises a re-association response.

12. The apparatus of claim 10, wherein the one or more processors are further configured to execute the instructions and cause the apparatus to:
  obtain, from the station as part of the PASN procedure, a second indication of a capability of the station to support establishing the first set of keys via the pre-association security association (PASN) procedure.

13. The apparatus of claim 10, wherein the one or more processors are further configured to execute the instructions and cause the apparatus to encrypt the response, based on the first set of keys, using an authentication and key management (AKM) function.

14. The apparatus of claim 13, wherein the AKM function comprises:
  a Pairwise Master Key Security Association (PMKSA) based AKM function;
  a Simultaneous Authentication of Equals (SAE) based AKM function;
  a Fast Initial Link Setup (FILS) based AKM function;
  a fast transition (FT) based AKM function;
  an Opportunistic Wireless Encryption (OWE) based AKM function;
  an Extensible Authentication Protocol (EAP) based AKM function; or
  a Pre-Shared Key (PSK) based AKM function.

15. The apparatus of claim 10, wherein the second set of keys comprises at least one of a Group Transient Key (GTK), an Integrity Group Transient Key (IGTK), or a Beacon Integrity Group Transient Key (BIGTK).

16. The apparatus of claim 10, wherein the one or more processors are further configured to execute the instructions and cause the apparatus to establish the first set of keys via:
  an extensible authentication protocol (EAP) procedure; and
  a four-way handshake procedure.

17. The apparatus of claim 16, wherein, in order to establish the first set of keys, the one or more processors are further configured to execute the instructions and cause the apparatus to:
  generate a pairwise master key (PMK) via the EAP procedure; and
  generate the PTK, from the PMK, via the four-way handshake procedure.

18. The apparatus of claim 10, further comprising at least one transceiver configured to at least one of receive the request or transmit the response, wherein the apparatus is configured as an access point (AP).

19. An apparatus for wireless communications, comprising:
  a memory comprising instructions; and
  one or more processors configured to execute the instructions and cause the apparatus to:
    establish a first set of one or more keys, via a key exchange with an access point (AP); and
    use the first set of one or more keys to process at least one of a first authentication message output, for transmission to the AP, as part of a pre-association security association (PASN) procedure or a second authentication message obtained from the AP, as part of the PASN procedure, wherein authentication and key management (AKM) data included in at least one of the first authentication message output for transmission to the AP or included in the second authentication message obtained from the AP is encrypted based on the first set of one or more keys.

20. The apparatus of claim 19, further comprising:
  a transceiver configured to at least one of:
    transmit the first authentication message to the AP; or
    receive the second authentication message from the AP,
  wherein:
    the apparatus is configured as a station.

21. The apparatus of claim 19, wherein the key exchange comprises a Diffie Hellman key exchange.

22. The apparatus of claim 19, wherein the first set of keys is used to encrypt at least one of: a robust security network element (RSNE) included as payload in the authentication message outputted for transmission to the station; or an extended RSNE (XRSNE) included as payload in the authentication message outputted for transmission to the station.

23. The apparatus of claim 19, wherein the first set of keys is used to encrypt at least one of: a robust security network element (RSNE) or extended RSNE (XRSNE) included as payload in the authentication message obtained from the station.

* * * * *